United States Patent
Su et al.

(10) Patent No.: US 7,555,940 B2
(45) Date of Patent: Jul. 7, 2009

(54) CANTILEVER FREE-DECAY MEASUREMENT SYSTEM WITH COHERENT AVERAGING

(75) Inventors: Chanmin Quanmin Su, Ventura, CA (US); Jian Shi, Goleta, CA (US)

(73) Assignee: Veeco Instruments, Inc., Woodbury, NY (US)

( * ) Notice: Subject to any disclaimer, the term of this patent is extended or adjusted under 35 U.S.C. 154(b) by 0 days.

(21) Appl. No.: 11/492,740

(22) Filed: Jul. 25, 2006

(65) Prior Publication Data

US 2008/0022759 A1      Jan. 31, 2008

(51) Int. Cl.
*G01B 5/28* (2006.01)
(52) U.S. Cl. ....................................................... 73/105
(58) Field of Classification Search .................... 73/105
See application file for complete search history.

(56) References Cited

U.S. PATENT DOCUMENTS

| | | | |
|---|---|---|---|
| 4,365,533 A | | 12/1982 | Clark et al. |
| 5,477,732 A | * | 12/1995 | Yasue et al. .................... 73/105 |
| 6,008,489 A | * | 12/1999 | Elings et al. ................. 250/234 |
| 6,038,916 A | * | 3/2000 | Cleveland et al. ............. 73/105 |
| 6,776,030 B1 | * | 8/2004 | Kirpichnikov et al. ........ 73/105 |
| 6,880,386 B1 | | 4/2005 | Krotil |
| 6,904,786 B2 | | 6/2005 | Matsiev |
| 6,935,167 B1 | * | 8/2005 | Sahin et al. .................... 73/105 |
| 2002/0092340 A1 | | 7/2002 | Prater |
| 2004/0084618 A1 | | 5/2004 | Spizig |
| 2005/0028583 A1 | | 2/2005 | Su et al. |
| 2005/0034512 A1 | | 2/2005 | Su |
| 2005/0121615 A1 | | 6/2005 | Prater |
| 2006/0000263 A1 | | 1/2006 | Su et al. |
| 2006/0005614 A1 | | 1/2006 | Sahin |

OTHER PUBLICATIONS

A. Roters et al., Distance-dependent noise measurements in scanning force microscopy, J. Phys. Condens. Matter, v8, pp. 7561-7577, (1996).
P. Hoffmann et al., Energy Dissipation in Atomic Force Microscopy and Atomic Loss Processes, Phys. Rev. Lett., v87, n26, (2001).
W. Heinz et al., Spatially resolved force spectroscopy of biological surfaces using the atomic force microscope, Nanotechnology TIBTECH, v17, pp. 143-150, (1999).
U. Rabe et al., Quantitative determination of contact stiffness using atomic force acoustic microscopy, Ultrasonics v38, pp. 430-437, (2000).
J. Wu et al., Thermo-Mechanical Responses of a Surface-Coupled AFM Cantilever, J. Biomechanical Engineering, v127, pp. 1208-1215, (2005).
K. Yamanaka et al., Quantitative Material Characterization by Ultrasonic AFM, Surface and Interface Analysis, v27, pp. 600-606, (1999).
WITEC (Wissenschaftliche Instrumente und Technologie GmbH), Atomic Force Microscopy Pulsed Force Mode, (2000).
International Search Report and Written Opinion of the International Searching Authority dated Oct. 28, 2008 in PCT application PCT/US07/73914.

* cited by examiner

*Primary Examiner*—Michael Cygan
(74) *Attorney, Agent, or Firm*—NUPAT, LLC; M. Ulman

(57) ABSTRACT

A system and method for measuring sample material properties by coherently averaging cantilever free-decay signals in a scanning probe microscope is described.

22 Claims, 11 Drawing Sheets

A

B

C

Height

Q f

US 7,555,940 B2

CANTILEVER FREE-DECAY MEASUREMENT SYSTEM WITH COHERENT AVERAGING

TECHNICAL FIELD

The disclosure relates generally to scanning probe microscopes. In particular it relates to measurement of material properties with scanning microcantilever probes.

BACKGROUND

Scanning probe microscopes (SPM) are a class of microscopes that can produce images of surfaces (e.g. topography) with better than 100 nanometer spatial resolution. In some cases individual atoms on a surface can be resolved. Over the past several years scanning probes have been extended to new modes of operations such as magnetic resonance force microscopy, scanning capacitance microscopy and many others. These new modes offer scientists and engineers deeper understanding of surface physical, chemical and biological phenomena.

Scanning probe microscopy is in a period of continual technological development with significant effort devoted to inventing and perfecting new measurement tools and techniques.

BRIEF DESCRIPTION OF THE DRAWINGS

The drawings are heuristic for clarity.

DETAILED DESCRIPTION

Figure 1:
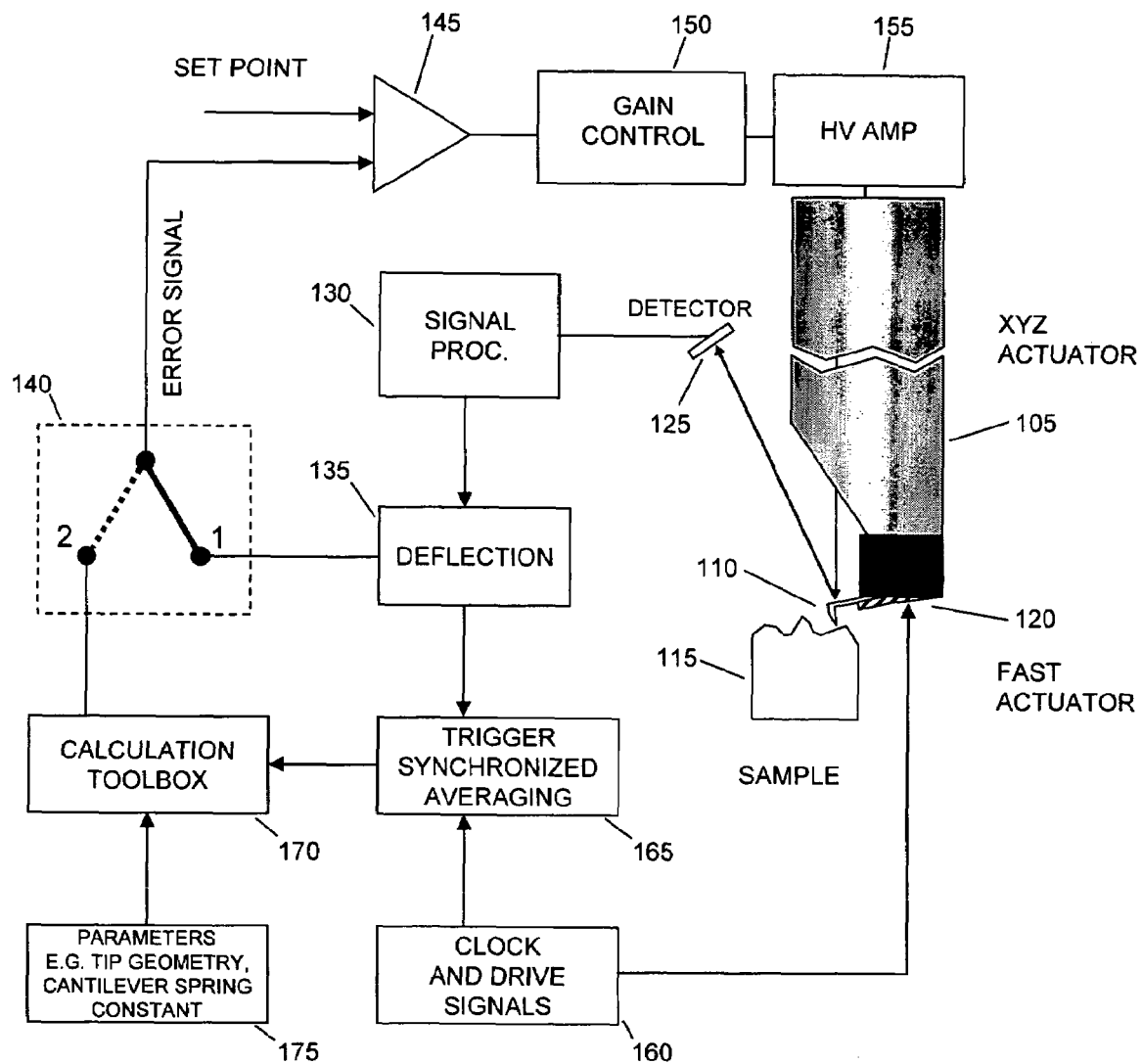
FIG. 1 shows a scanning probe microscope system capable of coherently averaging cantilever free-decay measurements.

A cantilever free-decay measurement system with coherent averaging presents a new way of making local measurements of material properties such as elastic and viscoelastic properties, energy dissipation, adhesion between materials, and capillary forces. These properties can be measured on a microscopic scale and with wide dynamic range. Further, measurements that take seconds using conventional techniques may be obtained in milliseconds.

A cantilever free-decay measurement system with coherent averaging includes: an active cantilever that can be excited with driving signals; frequency and/or damping measurements of free (i.e. not driven) oscillations of the cantilever; and, a system for coherently averaging of a series of cantilever responses. These elements form an enhancement, and bring new utility, to scanning probe microscope (SPM) systems.

The modern era of scanning probe microscopy began with the introduction by Binnig and Rohrer of the scanning tunneling microscope (STM) in 1981. In 1985 Binnig, Quite and Gerber invented the atomic force microscope (AFM) which has at its heart a microcantilever with a sharp tip on its free end. Movement of the cantilever is monitored using optical, piezoresistive, or STM techniques and is related to force on the tip through Hooke's law.

When a cantilever tip is brought in close proximity to a sample surface, the tip and the surface interact; i.e. movement of the cantilever is disturbed compared to its movement when the tip is far from the sample. As a simple example, when the cantilever is positioned such that the tip touches a sample surface, the cantilever bends.

However, a cantilever tip need not make contact with a sample in order to interact with it. "Interacting" includes any situation where forces between a cantilever tip and a sample influence the motion of the cantilever. Forces including atomic repulsion, Van der Waals, adhesion, electrostatic, magnetic, capillary, hydrophobic, double-layer, brush, polymer and bio-molecular extension, elastic and binding forces are examples of forces that may exist between a tip and a sample and thereby influence the motion of a cantilever. When a cantilever tip and a sample are far enough away from each other that further increasing the distance between them has no effect on the motion of the cantilever, then the tip and sample are no longer "interacting".

As another example, consider a cantilever (with a tip) that is made to vibrate near a sample. The vibration of the cantilever could be a driven oscillation in response to a driving force or a free oscillation in the absence of a driving force. If the tip of the cantilever is brought close enough to the sample to interact with it, characteristics of the cantilever vibrations will change in response to the tip—sample interaction. For example, the frequency or amplitude of the vibrations may change. In some cases, the amplitude of vibrations may be large enough that the tip touches the sample intermittently.

Another situation in which a tip interacts with a sample occurs when a force curve is obtained. A force curve is a graph of force on a cantilever tip as a function of distance between a sample and the fixed end of the cantilever; i.e. the end opposite that which has the tip. When the cantilever and tip are far away from the sample (not interacting) the force curve is flat. When the tip is in contact with the sample the force curve is a sloped line reflecting Hooke's law. It is between these two extremes that interesting information about tip—sample interactions, and therefore material properties, is obtained.

Sensitive force curve measurements, for example in the regime where a tip interacts with a sample but is not in contact with it, are valuable for probing viscoelasticity, adhesion, and other properties of samples. As is the case in many physical measurements, differential techniques may be used to enhance sensitivity. Thus, force curves may be obtained with cantilevers oscillating either normal or parallel to a surface depending on the particular measurement required.

A sensitive method of probing tip—sample forces involves measuring the free decay of cantilever oscillations. In this method a cantilever (with a tip) is set in oscillatory motion by a temporary driving signal. The driving signal can be a step function, an impulse, a short burst of pulses with a repetition rate near the frequency of a cantilever mode, etc. The mode can be the fundamental mode or any higher order mode. If this is done while the tip is not interacting with a sample, the free decay of cantilever vibrations can be observed after the driving signal ceases. This is one way to characterize a cantilever's spring constant and energy dissipation in a matter of milliseconds.

If the same experiment is performed while the tip is close enough to a sample to interact with it, the free decay of cantilever vibrations can be similarly observed. Differences in the interacting free-decay measurements compared to the non-interacting case can be attributed to tip—sample forces, and material properties affecting those forces can be calculated. (Note: Free decay oscillations of a cantilever are contrasted with driven oscillations. Whether or not oscillations occur when the cantilever tip is interacting with a sample is a separate and different consideration.)

If free-decay measurements of an interacting tip are performed when the amplitude of cantilever oscillations is small, features in a small segment of a force curve may be probed. Unfortunately, measurements of small amplitude oscillations are often noisy. Noise may be overcome, however, by coherent averaging.

Consider, as an example, a cantilever excited by an impulse. The cantilever has an impulse response which may be modeled as a damped harmonic oscillation. Coherent averaging may be used to improve the signal-to-noise ratio of oscillation data by adding several impulse response measurements. If the impulse which drives the cantilever is also triggers a recording measurement system that records the cantilever impulse response, then several repetitions of the impulse response can be added together coherently. Noise, on the other hand, has no relationship to the impulse and therefore will be averaged out in a sum of impulse responses. The same principle applies to oscillations excited by other temporary driving signals which may be modeled as a superposition of impulse driving signals.

Coherent averaging permits the measurement of small-amplitude cantilever free-decay oscillations. That information, combined with parameters such as the cantilever spring constant and details of the tip geometry, can be used to calculate material properties of a sample with spatial resolution of 100 nanometers or better.

An active cantilever is one in which vibrational modes can be excited by a fast actuator. Often the fast actuator is integrated with the cantilever itself. Oscillatory motion of a cantilever can be detected optically or electronically and recorded with a data recording system; e.g. an analog-to-digital converter coupled to a processor and a memory. If the data recording system is triggered or clocked by the same signals that drive the fast actuator, then coherent averaging of the recorded data is possible. Alternatively, data averaging may be triggered by a cantilever oscillation signal passing a threshold value.

A cantilever free-decay measurement system with coherent averaging will now be further described in connection with the drawings.

FIG. 1 shows a scanning probe microscope system capable of coherently averaging cantilever free-decay measurements. In FIG. 1, XYZ actuator 105 moves cantilever (with tip) 110 in relation to sample 115. Cantilever 110 is connected to a fast actuator 120 which can impart driving signals to the cantilever. Detector 125 is an optical detector (e.g. a split photodiode) that senses a laser beam reflected from the cantilever and therefore the position and motion of the cantilever. Signal processing components 130 take raw signals from detector 125 and generate a cantilever deflection signal 135. Signal processing components 130 may include, for example, low-pass filters, differencing circuits, trans-impedance amplifiers, etc. Switch 140 connects deflection signal 135 to amplifier 145. Amplifier 145 amplifies the difference between an error signal and a set point. When switch 140 is in position 1, deflection signal 135 is the error signal. (When switch 140 is in position 2, an output of calculation toolbox 170 serves as the error signal.) Gain control 150 and high voltage amplifier 155 connect the output of amplifier 145 to XYZ actuator 105, thus forming a feedback loop.

In one operation mode the feedback loop is set to maintain a constant force between the tip of cantilever 110 and sample 115. Other operation modes are possible in which XYZ actuator 105 is driven in response to an error signal to maintain a measured parameter such as cantilever vibration frequency, or a calculated parameter such as stiffness, constant. Closed-loop operation modes incorporate feedback to keep a tip—sample interaction constant as XYZ actuator 105 scans the cantilever and tip across a sample surface.

Switch 140 may also be disconnected altogether (i.e. neither terminal 1 nor terminal 2 connected to the error signal) to operate the system in an open-loop mode. In this case a signal (e.g. a linear ramp) may replace the constant set point input to amplifier 145, causing XYZ actuator 105 to move the tip relative to the sample without feedback control. Open-loop operation is useful, for example, during the acquisition of force curves, rapid characterization of cantilevers that are not interacting with a sample, or for other purposes.

Although FIG. 1 shows XYZ actuator 105 arranged to move cantilever 110 near a fixed sample 115, an alternative set-up could have an XYZ actuator move a sample near a fixed cantilever. Or both the cantilever and the sample could have actuators. It is the ability to adjust the relative position of the cantilever (and its tip) and the sample that matters rather than which one moves with respect to "fixed" parts of the entire apparatus.

Although not shown in FIG. 1, a controllable sample environment may be provided to control the composition of fluids or gases in contact with the sample and/or the temperature of the sample.

In FIG. 1 clock and drive signals unit 160 sends signals to fast actuator 120 and to trigger synchronized averaging unit 165. Calculation toolbox 170 takes as its inputs data output by trigger synchronized averaging unit 165 and calculation parameters provided at 175. Calculation parameters include, for example, the cantilever tip geometry and the cantilever spring constant. The output of the calculation toolbox may be any of a number of signals corresponding cantilever response or to sample material properties calculated from the cantilever response.

Switch 140 illustrates that the scanning probe microscope system of FIG. 1 can operate in both basic and advanced modes. A basic mode (as indicated by the solid line between switch terminals, position 1) is one in which the switch connects the deflection signal 135 to amplifier 145. In an advanced mode (as indicated by the dotted line between switch terminals, position 2) the switch connects a signal from calculation toolbox 170 to amplifier 145. Advanced modes offer the possibility of creating images corresponding to surfaces of constant cantilever free-decay frequency or damping, as examples.

Figure 2:
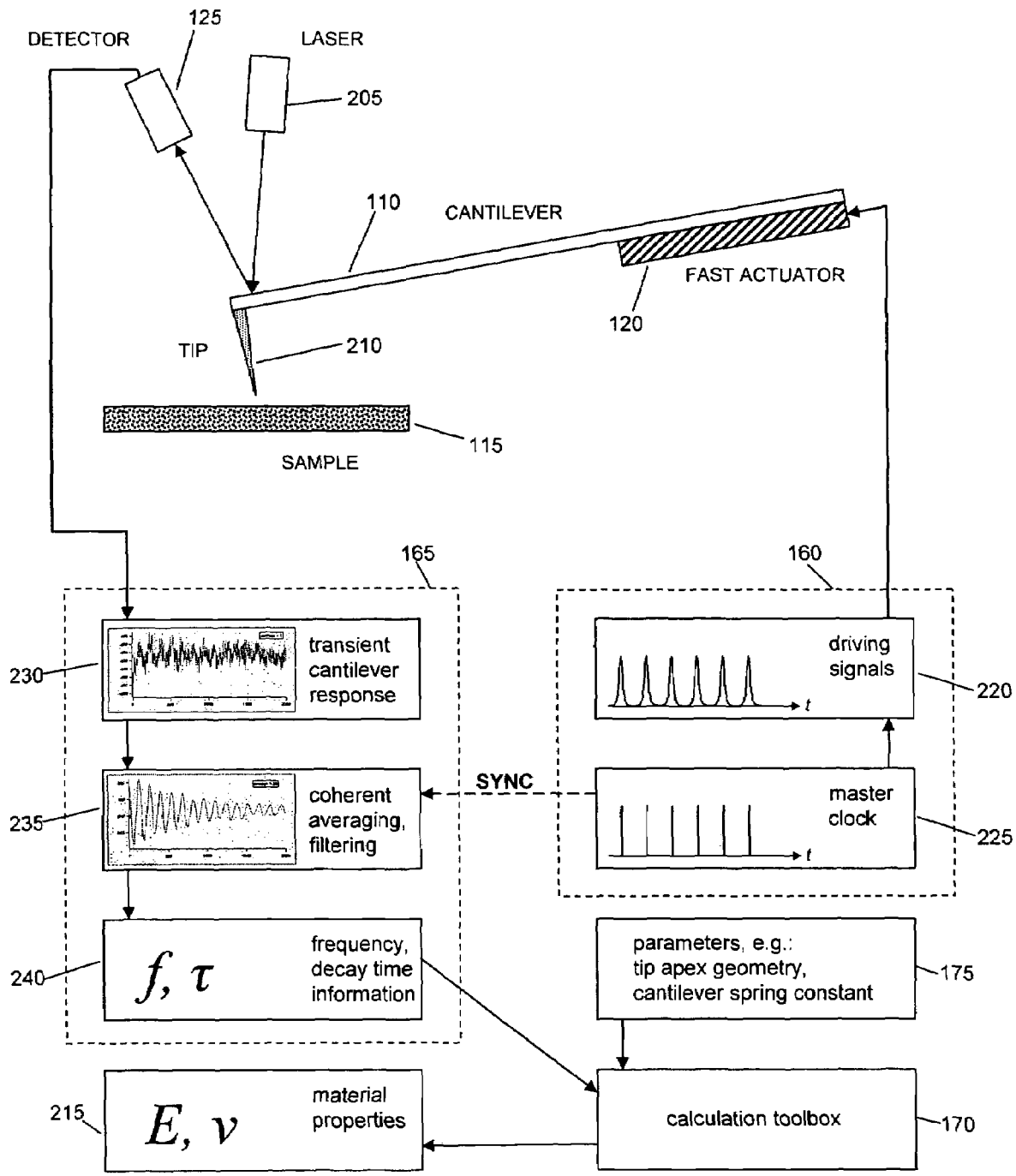
FIG. 2 shows additional aspects of a scanning probe microscope system capable of coherently averaging cantilever free-decay measurements.

FIG. 2 shows additional aspects of a scanning probe microscope system capable of coherently averaging cantilever free-decay measurements. FIG. 2 takes a closer look at advanced operation modes represented by switch position 2 in FIG. 1. In FIG. 2, items numbered the same as in FIG. 1 refer to the same objects or functional blocks even though they may be illustrated differently. Some item numbers point out details that were not visible in FIG. 1. Further, many items are omitted in FIG. 2 for clarity; e.g. high voltage amplifier 155 and XYZ actuator 105 are not shown.

In FIG. 2, oscillations in cantilever 110 are excited by fast actuator 120. Cantilever 110 has a sharp tip 210 which interacts with sample 115. Fast actuator 120 may be integrated with cantilever 110 as is the case with an integrated zinc oxide (ZnO) piezoelectric cantilever, for example. Other types of suitable actuators include electrostatic, thermomechanical, magnetic or ultrasonic actuators. Laser 205 shines light on cantilever 110 and reflected light is received by detector 125. Other means of detecting cantilever movement, such as those involving integrated piezoresistive cantilever strain sensors are also useful.

Master clock 225 may be any kind of electronic time reference such as an electronic oscillator, a stable multivibrator, voltage controlled oscillator, quartz crystal oscillator, micromechanical resonator, or a signal generated by a computer, analog or digital device or circuit. Digital devices capable of generating a master clock signal include, for example, a personal computer, an FPGA, a programmable logic device, or a microcontroller. Any alternative device that creates periodic signals with sufficient time resolution for the desired transient repetition rate can serve as the master clock.

One of the master clock's functions is to trigger driving signals 220 which are sent to fast actuator 120. Driving signals 220 may be impulses, square pulses, step functions, sine waves, pulse packets, wave packets, etc., amplified appropriately to drive fast actuator 120. Driving signals are imparted to the cantilever through fast actuator 120 which excites vibrations in cantilever 110. The fast actuator may be supplied in many different forms. For example, it may comprise a piezoelectric film deposited on or near the cantilever. A small piezo stack, a monolithic piezo device, or an actuator using electrostatic, electrostrictive, magnetostrictive, thermo-mechanical, optical or acoustic radiation pressure may be used. A variety of actuator drive mechanisms are described in the literature and are familiar to those skilled in the art. Alternatively, any other method that produces a force or displacement of the cantilever can be used to convert a drive signal into cantilever motion.

When cantilever free-decay measurements are taking place, the driving signals are temporary or intermittent as contrasted with continuous driving signals. The transition from driven oscillation to free oscillation of a cantilever takes place at the instant that a driving signal ceases. Master clock 225 and driving signals 220 shown in FIG. 2 are part of clock and drive signals unit 160 of FIG. 1.

Master clock 225 also sends a clock signal (labeled "SYNC" in the figure) to coherent averaging and filtering unit 235. Cantilever transient response data 230, coherent averaging and filtering 235, and frequency and decay time information 240 are parts of trigger synchronized averaging unit 165 of FIG. 1. Frequency information can include, for example, the oscillation frequency, period, content of higher order flexural modes, and other properties of the cantilevers periodic motion. Decay time information may include, for example, the time to decay to 1/e or any other arbitrary fraction of the initial oscillation amplitude. It may also include any other quantity representative of the rate of decay or time of decay of the cantilever motion. Cantilever transient response data 230 represents raw data from detector 125. Transient responses are those that are excited by temporary driving signals and/or transient forces applied to the tip, and may be contrasted to steady state responses excited by continuous driving signals.

Coherent averaging and filtering unit 235 records several transient cantilever responses 230 and averages them. The averaging is coherent because it is registered in time by synchronization signals (labeled "SYNC" in the figure) from master clock 225. Transient cantilever responses to driving signals 220 are coherent with clock signals from master clock 225. Noise, on the other hand, is not coherent and can be averaged out in coherent averaging and filtering unit 235. This improves the signal-to-noise ratio of the transient cantilever response data. Noise may be further reduced by filtering. For example, a low-pass filter designed to pass frequencies above the cantilever's fundamental vibration frequency but below the frequency of the first higher order mode may be used. Filters with other frequency bandwidths may also be useful.

It is also possible for coherent averaging and filtering unit 235 to perform coherent averaging without the benefit of a synchronization signal from master clock 225. For example, the coherent averaging and filtering unit can generate its own trigger signal based on a transient response signal crossing a threshold signal level or slope.

The output of the coherent averaging and filtering unit is transient cantilever response data with improved signal-to-noise compared to the raw responses 230. The averaged and filtered transient response data may be modeled or fit by a damped harmonic oscillation function which is characterized by a frequency, f, and an exponential time constant, $\tau$. Of course, more complicated fitting functions involving more than one frequency and/or time constant or other functional forms may be used. The discussion here is limited to one frequency and time constant only for simplicity.

Frequency and decay time information 240 is sent to a calculation toolbox 170 (e.g. a computer processor with memory) for use in calculating material properties of the sample 115. Calculation toolbox 170 uses frequency and/or decay time information in combination with parameters 175 such as tip apex geometry and cantilever spring constant to determine material properties such as elasticity and energy dissipation.

Briefly, the cantilever free-decay frequency is measured both when the tip is and is not interacting with a sample. That information, combined with the cantilever spring constant, determines contact stiffness. Contact stiffness is an effective spring constant of the cantilever when it is interacting with a sample. It combines the actual cantilever spring constant and the derivative, with respect to tip—sample separation, of the interaction potential between the tip and the sample. Since contact stiffness and cantilever spring constant can be measured, the interaction potential of the tip—sample interaction can be calculated.

Real frequency measurements lead to elastic material properties such as the elastic modulus. Damping (i.e. time decay information) can be considered as an imaginary component of the cantilever free-decay response. It is related to dissipative properties of a sample such as friction, viscoelasticity, capillary interactions, etc. Dissipative properties are often summarized by the parameter, $\tan \delta = (\pi \tau f)^{-1}$, where $\tau$ is the decay time constant and f is the frequency of the transient cantilever response. $\tan \delta$ is also equal to the imaginary part divided by the real part of the elastic modulus of a sample.

As an example of a material property calculation, consider a cantilever whose spring constant in a flexural mode is $k_{flex}$. This quantity may be calculated from cantilever dimensions and known properties of the cantilever material or measured by deformation of the cantilever by a known force. Free decay frequencies of the cantilever while it is interacting and non-interacting with a sample may be measured and designated $f_{flex,in}$ and $f_{flex,non}$ respectively. Contact stiffness, $K_{flex}$, is then given by:

$$K_{flex} = k_{flex}\left(\frac{f_{flex,in}^2}{f_{flex,non}^2} - 1\right). \quad (1)$$

Eq. 1 is adequate for simple, diving-board-shaped cantilevers when the contact stiffness is not very much greater than the cantilever spring constant. In other situations more complicated formulas or finite element analysis may be needed to derive contact stiffness from the cantilever spring constant and the interacting and non-interacting free-decay frequencies.

$K_{flex}$, is a material property of a sample as measured by a cantilever tip with a particular radius. It is related to the reduced elastic modulus, E', by:

$$K_{flex} = 2E'a \quad (2).$$

In Eq. (2), a is the contact radius. In a Hertzian model contact radius is related to modulus by, $$a^3 = \frac{4}{3}\frac{\chi PR}{E}, \quad (3)$$

where R is the tip apex radius, P is the applied load, E is the modulus and $\chi$ is a constant approximately equal to 0.62. Equations (2) and (3) may be solved for elastic constant, E. Alternatively, other models such as the Oliver-Pharr, Sneddon or Mougis models, or others may be used to derive sample material properties from cantilever free-decay measurements.

Dissipative properties of a tip—sample interaction are summarized by the parameter, $\tan\delta = (\pi\tau f_{flex})^{-1}$, where $\tau$ is the decay time constant and $f_{flex}$ is the frequency of the transient cantilever response. Further, $$\tan\delta = \frac{1}{2\pi}\frac{\Delta w}{w}, \quad (4)$$

where $\Delta w$ is the energy dissipation and $$w = \frac{1}{2}k_{flex}z^2$$

is the energy stored in the cantilever during one oscillation cycle. Eq. (4) is generally applicable to energy dissipation caused by any physical interaction mechanism; e.g viscoelastic dissipation, adhesion-induced dissipation, electromagnetic dissipation, deformation/de-bond dissipation, capillary dissipation, thermodynamic dissipation, etc. The real and imaginary parts of the contact stiffness of Eq. (2) may also related to tan $\delta$ through:

$$\tan\delta = \frac{E_{imaginary}}{E_{real}}. \quad (5)$$

The discussion above used the flexural mode spring constant, $k_{flex}$, for calculating material properties normal to a sample surface. However, the torsional mode spring constant, $k_{tor}$, may be used for calculating material properties parallel to a sample surface as probed by a cantilever flexing in a torsional mode.

Real and imaginary parts of the frequency of a transient cantilever free-decay signal, or functions of those quantities, can be used for point measurements of viscoelastic, adhesion and other properties of a sample. However, they may also be used as an error signal in the XYZ positioning feedback loop of a scanning probe microscope system. This is indicated in FIG. 1 by switch 140, position 2, where the output of the calculation toolbox 170 is connected to amplifier 145. In this way, two dimensional images of, for example, the elastic properties of a sample surface can be generated. Further, it may be useful to operate a scanning probe microscope system in a switched mode where both topography (switch 140, position 1) and material property (switch 140, position 2) images are created. Switch 140 can be implemented in electronics that permit rapid transitions between the two modes of operation.

Figure 3A:
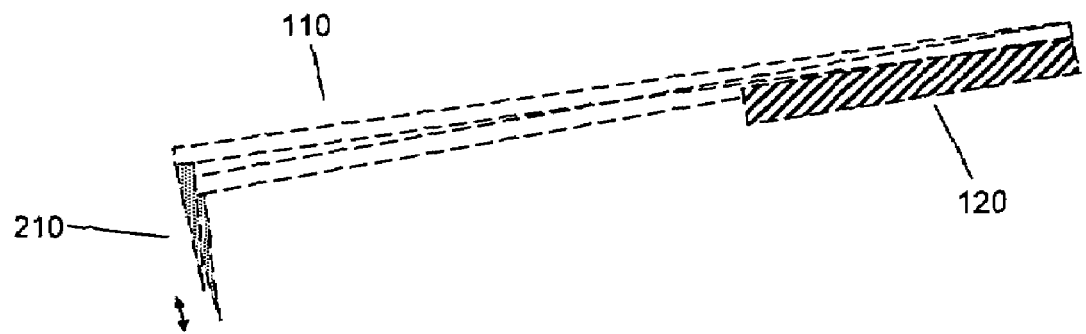
FIGS. 3A & 3B show cantilevers flexing in various vibration modes.
Figure 3B:
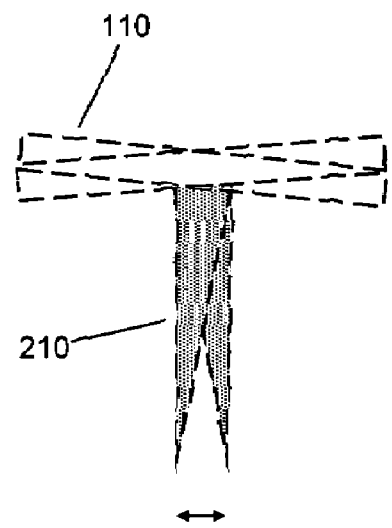

FIGS. 3A & 3B show cantilevers flexing in various vibration modes. Dotted lines indicate cantilever positions at various points in an oscillation. In FIG. 3A cantilever 110 with tip 210 and fast actuator 120 is illustrated in a flexural mode in which the tip moves approximately perpendicular to a sample surface (not shown). In contrast FIG. 3B illustrates cantilever 110 with tip 210 in a torsional mode in which the tip moves approximately parallel to a sample surface (not shown). Flexural and torsion modes facilitate vertical and lateral measurements of sample properties respectively. The entire discussion of a scanning probe microscope system with coherent averaging of cantilever free-decay oscillations applies to both flexural and torsional modes. Furthermore, higher order as well as fundamental cantilever vibrational modes may be excited if desired.

Figure 4:
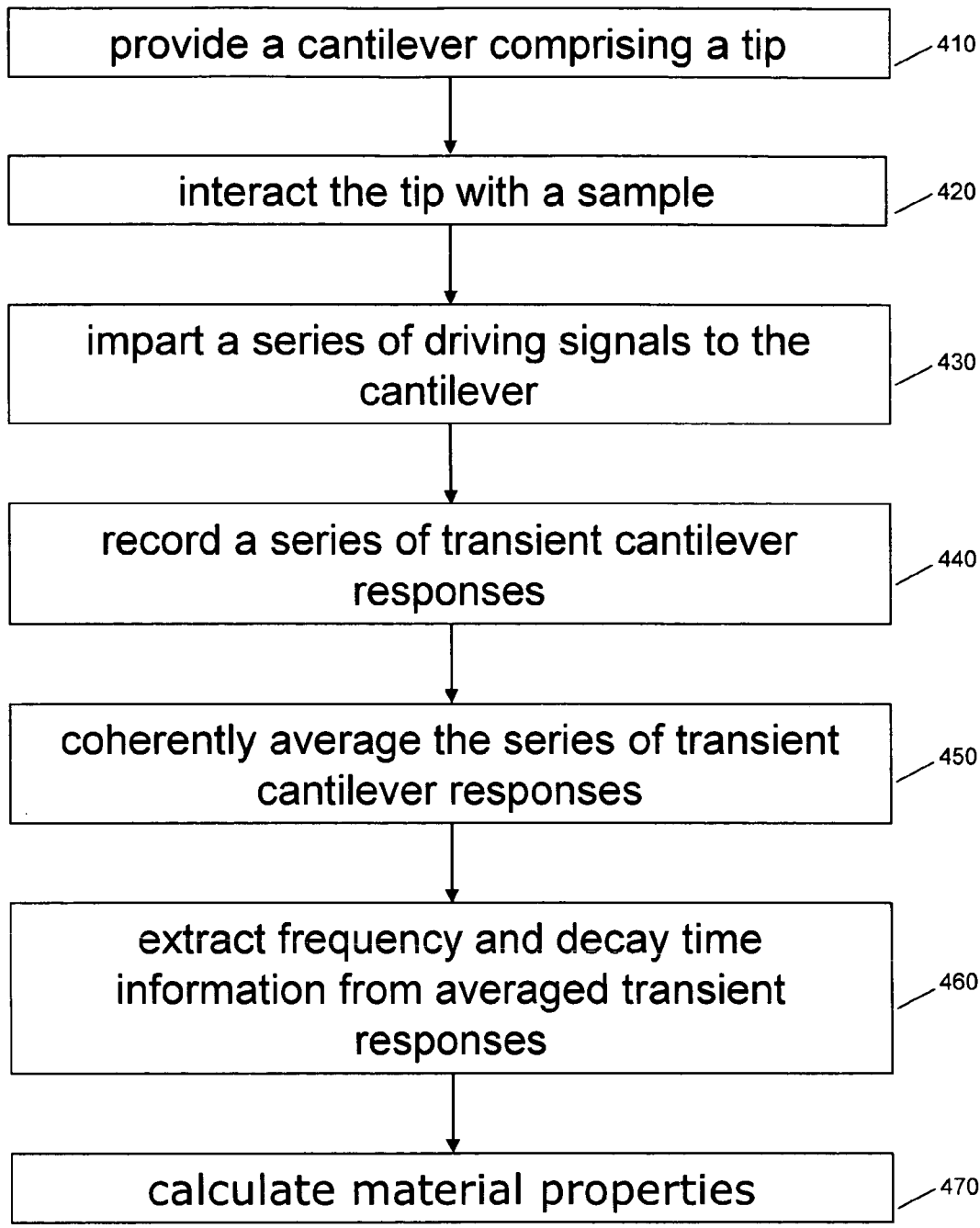
FIG. 4 is a flow chart for a method for measuring properties of a sample.

FIG. 4 is a flow chart for a method for measuring properties of a sample. The steps of the method summarize many of the operations described herein. In the method, step 410 is providing a cantilever comprising a tip. Step 420 is interacting the tip with a sample. Step 430 is imparting a series of driving signals to the cantilever. Step 440 is recording a series of transient cantilever responses. Step 450 is coherently averaging the series of transient cantilever responses. Step 460 is extracting frequency and decay time information from averaged transient responses. Step 470 is calculating material properties.

Cantilever free-decay measurements are also useful for obtaining cantilever characteristics when a cantilever is not interacting with a sample. Free-decay measurements in the absence of tip—sample interaction may be used to provide cantilever tuning information prior to operating a scanning probe microscope in modes where knowledge of cantilever oscillation properties is needed. These modes include, as examples, tapping mode, magnetic force imaging mode, torsional resonance imaging mode and CD mode. In any of these or similar cases, steps 420 and 470 of FIG. 4 may be omitted.

Together or separately, frequency and/or decay time information can be used to calculate viscoelastic properties of a sample, including but not limited to elastic modulus, hardness, viscosity, energy dissipation, tan $\delta$, fracture toughness, plasticity, and creep, as examples. In combination with a sample heating capability, any of these properties can also be measured as a function of temperature.

Figure 5:
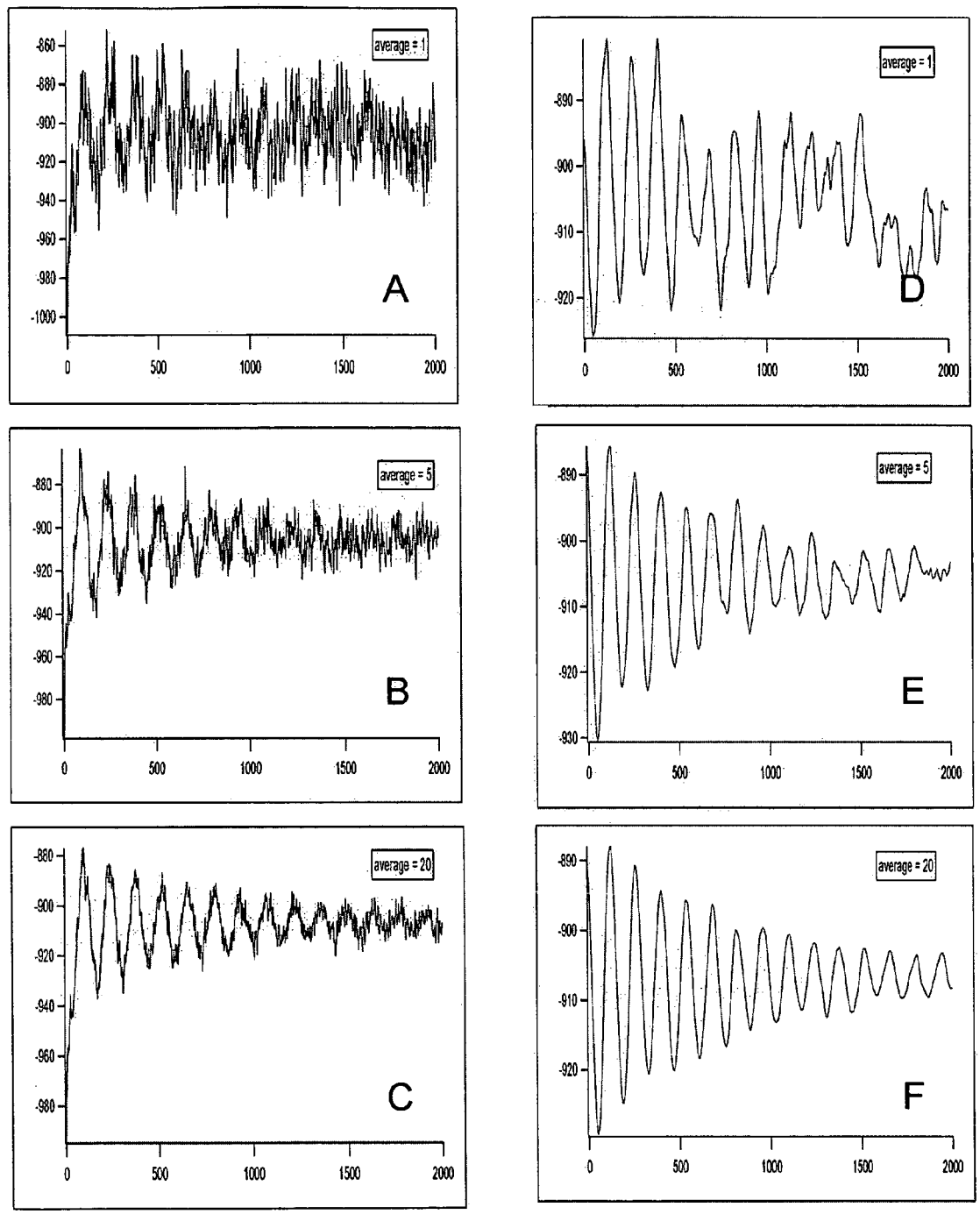
FIG. 5(A-F) is a series of graphs of cantilever position versus time.

FIG. 5(A-F) is a series of graphs of cantilever position versus time. The figure illustrates how coherent averaging and filtering improve the signal-to-noise ratio of transient cantilever response data. Graphs A-F of FIG. 5 show cantilever position (in arbitrary units) as a function of time. The time scale of each graph is marked in microseconds from zero to 2000. Graphs A-C show the effect of averaging 1 (i.e. not averaged), 5, and 20 repetitions of a cantilever free-decay measurement. Graphs D-F show the results of low-pass filtering the data of Graphs A-C, respectively. The low-pass filter cut-off frequency is set above the frequency of the cantilever fundamental mode but below the frequency of the next higher order mode. Averaging and filtering help produce transient response data from which precise frequency and decay time information may be extracted as may be seen by comparing, for example, graph A and graph F. Also since each measurement occurs in approximately 2 milliseconds and modern microprocessors perform frequency and decay time calculations extremely fast, it is apparent that materials properties can be determined for a point on a sample surface in often as little as 10 milliseconds and quite easily in less than 100 milliseconds.

Figure 6:
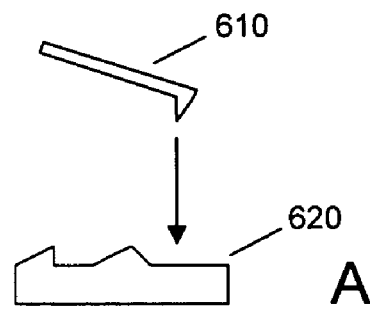
FIG. 6(A-D) is a series of illustrations showing schematically a probe at various interaction distances with respect to a sample.
Figure 6:
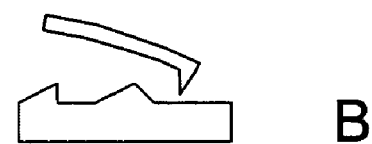
Figure 6:
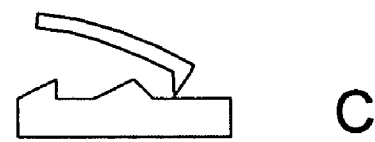
Figure 6:
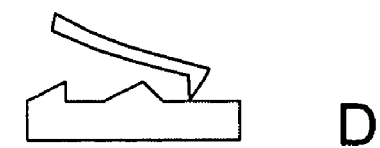

FIG. 6(A-D) is a series of illustrations showing schematically a probe at various interaction distances with respect to a sample. In FIG. 6, schematic illustration A shows a cantilever 610 with a sharp tip approaching a sample 620. Approach may be accomplished with stepper motor translation stages, high voltage piezoelectric transducers, or other positioning devices. Schematic illustration B shows the cantilever tip interacting with the sample in a regime where long-range forces are dominant. Schematic illustration C shows the cantilever tip interacting with the sample in a regime where short-range forces are dominant. Finally, schematic illustration D shows the cantilever tip interacting with the sample in a regime of increasing contact load. Conceptually, long range, short range, and contact regimes correspond to positive, negative and positive contact stiffness regimes that are encountered as the tip approaches a sample, interacts with it, and contacts it with increasing pressure. Cantilever free-decay measurements may be performed in each of the three interaction regimes at each point in a surface scan to build a two dimensional image of elastic and dissipative properties of a sample.

Figure 7:
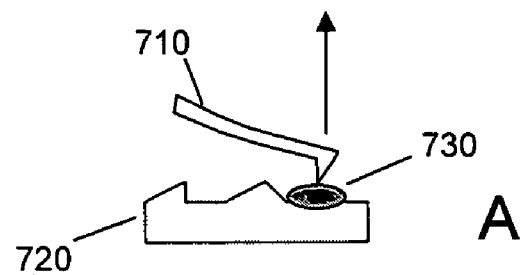
FIG. 7(A-C) is a series of illustrations showing schematically a probe in various interaction regimes with respect to a soft sample.
Figure 7:
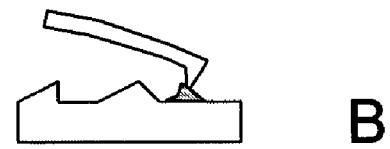
Figure 7:
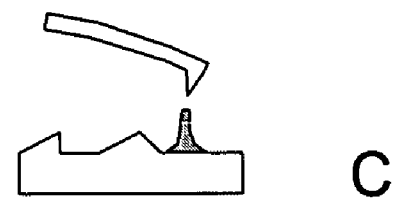

FIG. 7(A-C) is a series of illustrations showing schematically a probe in various interaction regimes with respect to a soft sample. In FIG. 7, schematic illustration A shows a cantilever 710 with a sharp tip interacting with a soft region 730 of a sample 720. Soft region 730 is shaded dark and appears deformed in different shapes in schematic illustrations B and C of FIG. 7. In schematic illustration B the cantilever tip exerts a force on the soft region away from the sample and thereby deforms the soft region somewhat. In schematic illustration C the cantilever tip has pulled the soft region far enough away from the sample that the soft region has ruptured. Cantilever free-decay measurements may be performed on soft regions of samples in interacting, pulling and rupture regimes at each point in a surface scan to build a two dimensional image of elastic and dissipative properties of a soft region of a sample.

FIGS. 8-11 show actual data obtained using apparatus and techniques described herein. Coherently averaged, cantilever free-decay data is obtained at various points of a force curve. Frequency and damping information is extracted from the free-decay oscillation data and is plotted versus sample position. Finally, two-dimensional images of topography, dissipative and elastic properties of a sample are presented.

Figure 8:
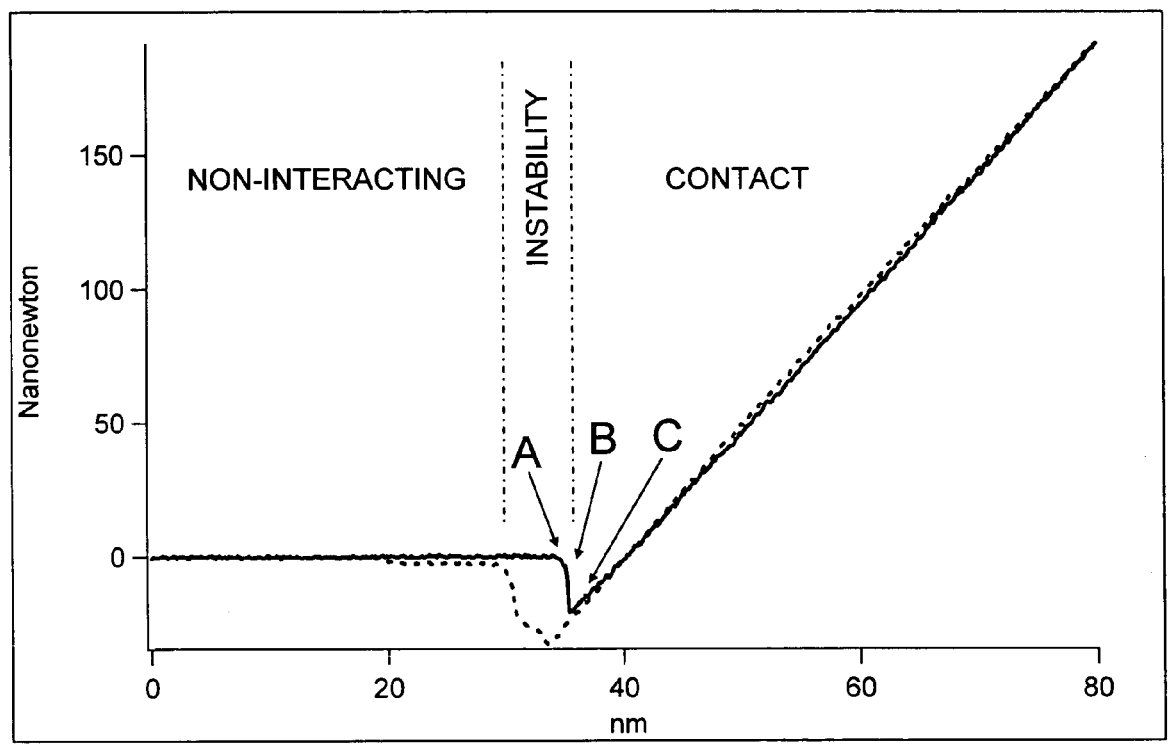
FIG. 8 is a cantilever-probe force curve.

FIG. 8 is a cantilever-probe force curve. The graph of FIG. 8 represents actual force versus distance data obtained with an approximately 390 μm long cantilever with an approximately 10 nm radius tip interacting with a Si sample. On the graph the distance scale extends over approximately 80 nanometers, while the force scale extends over approximately 200 nanoNewtons. The position of zero distance is arbitrary. The graph is divided approximately by vertical dash-dot lines into non-interacting, instability, and contact regions. The instability and contact regions are regions in which the tip is interacting with the sample. Also indicated by arrows are three points on the force curve labeled A, B and C. These points correspond to, and will be discussed in connection with, corresponding graphs A, B and C of FIG. 9 which are cantilever free-decay data for each point.

The force curve in the graph of FIG. 8 is plotted with solid and dotted lines. The solid line portion of the curve corresponds to data taken starting from the non-interacting regime as the cantilever tip approaches, interacts with, and contacts the sample with increasing pressure. The dotted line portion of the curve corresponds to data taken starting from the contact regime as the contact pressure is reduced, the tip interacts with the sample while not in contact, and finally the tip is far enough from the sample to be no longer interacting. Hysteresis in the curve is manifest mainly in the instability region where the solid and dotted lines do not overlap.

Figure 9:
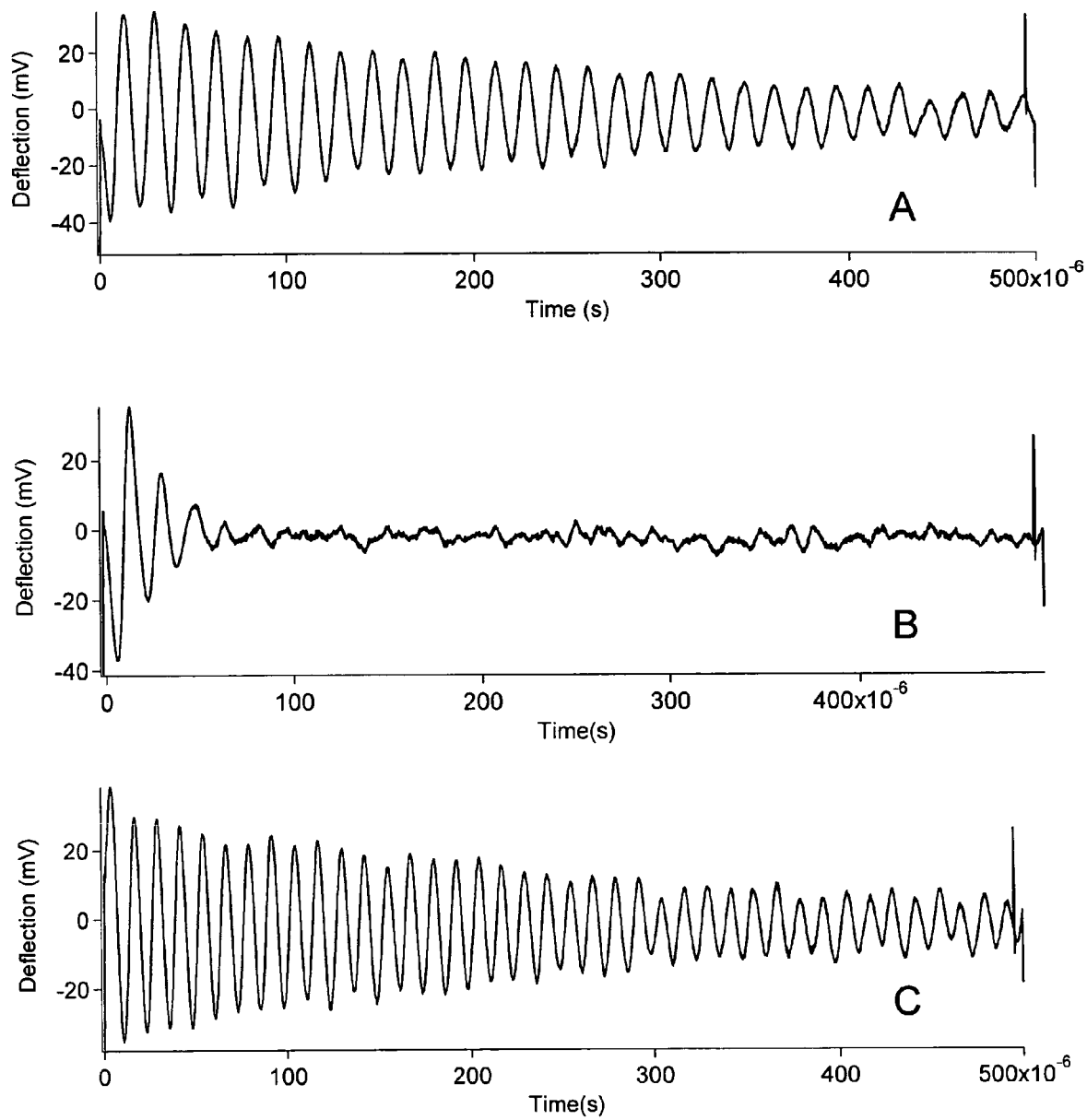
FIG. 9(A-C) is a series of graphs of cantilever position versus time.

FIG. 9(A-C) is a series of graphs of cantilever position (equivalently: "deflection") versus time. Graphs A, B and C of FIG. 9 are data taken at the corresponding labeled points A, B and C of the force curve of FIG. 8. The time scale in graphs A-C of FIG. 9 extends over approximately 500 microseconds. The deflection scale in the graphs is arbitrary. The deflection scale is labeled mV (millivolts) because (in this case) the physical measurement technique by which cantilever deflection was determined involved measuring the electrical output of an optical detector.

Each of graphs A-C in FIG. 9 has the approximate form of a damped harmonic oscillation. Further, each of the graphs represents a coherent average of 25 cantilever free-decay curves which has been filtered by a low-pass filter with a cut-off frequency of approximately 100 kHz. Coherent averaging of cantilever free-decay curves to generate graphs A-C was done by triggering a data recording device with the clock signal that triggered temporary driving signals sent to a cantilever fast actuator. However, triggering for coherent averaging could also be accomplished without the benefit of an external trigger by using a threshold trigger level. For example, the first upward crossing of the 20 mV level in each graph could have been used as a trigger condition.

It is apparent that graphs A-C each exhibit different frequency and damping characteristics which correspond to properties of the tip—sample interaction at various separations between the two. Frequency (f) and damping (tan δ) information can be extracted from data (such as graphs A-C of FIG. 9) at points of varying distances from a sample. Therefore, it is informative to construct graphs of frequency (f) and damping (tan δ) versus distance. This is shown in FIG. 10.

Figure 10:
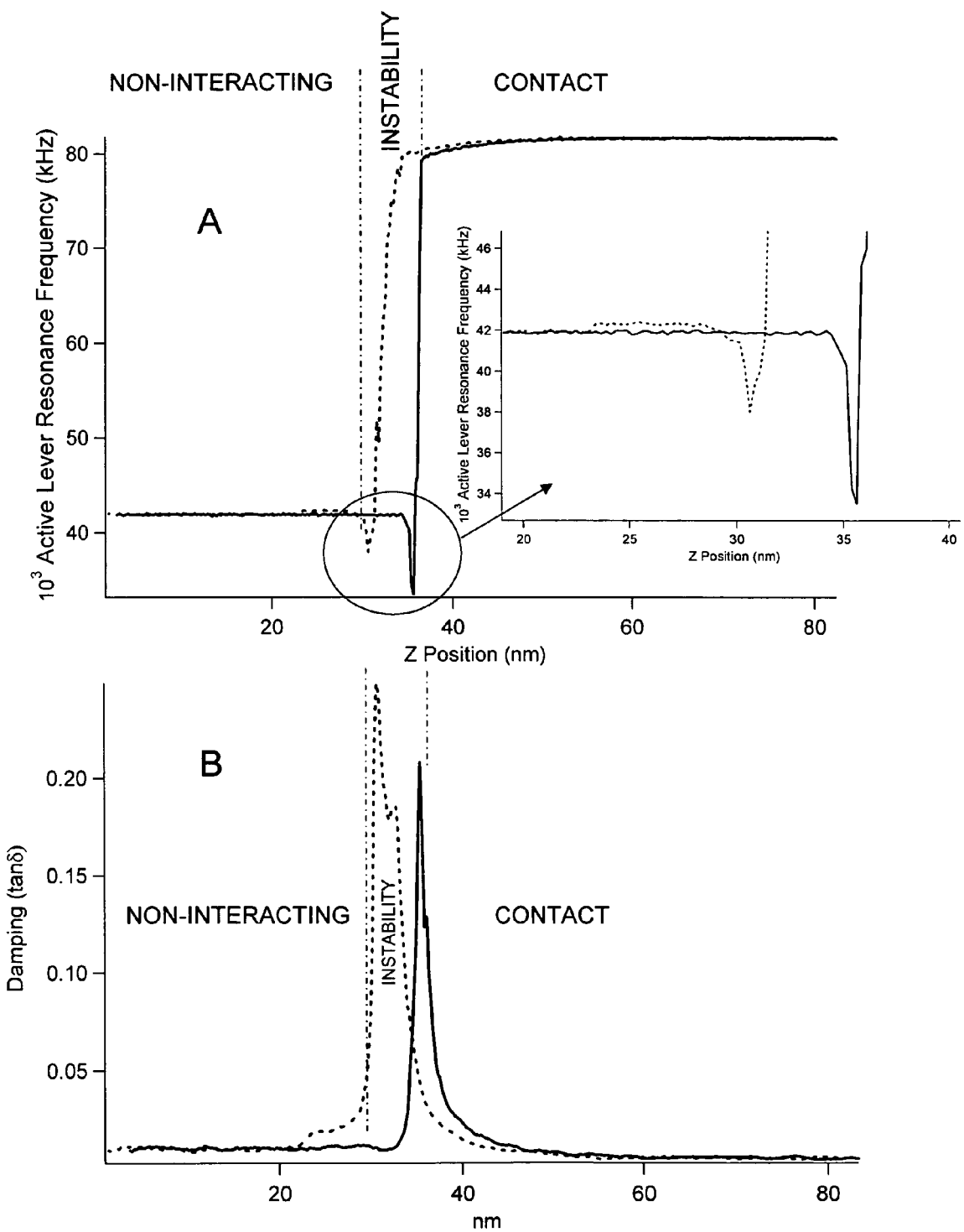
FIG. 10(A-B) shows cantilever resonance frequency and damping versus position relative to a sample.

FIGS. 10(A & B) are graphs of cantilever resonance frequency and damping versus position relative to a sample. The cantilever used in this experiment was approximately 390 μm long and approximately 7 μm thick with a tip of radius of approximately 10 nm. A system like that shown in FIG. 1 was used to move the cantilever relative to a sample under open-loop control. FIG. 10, graph A, shows the frequency ("active lever resonance frequency") of a cantilever free-decay oscillation versus sample position ("Z Position"). Frequency is marked in tens of kilohertz from approximately 40 kHz to approximately 80 kHz. Separation is marked in nanometers over a range of about 80 nanometers. The zero of position is arbitrary. Graph A is divided approximately by vertical dash-dot lines into non-interacting, instability, and contact regions. An inset shows data in the (circled) instability range plotted on a larger scale. Solid and dashed lines in the graph and the inset correspond to data taken during approach and retraction, respectively.

In the instability region it can be seen that the frequency of cantilever free-decay oscillations decreases to values less than that obtained in the non-interacting region. The contact stiffness (or effective spring constant of the cantilever) decreases to a value less than the non-interacting, mechanical stiffness (or spring constant) of the cantilever. This so-called "negative stiffness" is a consequence of the cantilever tip being located in an attractive (as contrasted with repulsive) portion of the interaction potential existing between the tip and the sample. Coherent averaging of cantilever free-decay oscillations is a technique that has the sensitivity required to observe negative stiffness phenomena.

FIG. 10, graph B, is plotted on the same horizontal scale as graph A; however, in the vertical scale graph B plots damping as represented by the dimensionless parameter, tan δ. Graph B is divided approximately by vertical dash-dot lines into the same non-interacting, instability, and contact regions as graph A. The tip—sample interaction exhibits maximum damping or energy dissipation in the instability region; however, peak damping occurs at different sample positions depending on whether the tip is approaching or moving away from the sample.

Figure 11:
FIG. 11 shows Height, Q and frequency images of an Alkain ($C_{390}$) surface.
Figure 11:
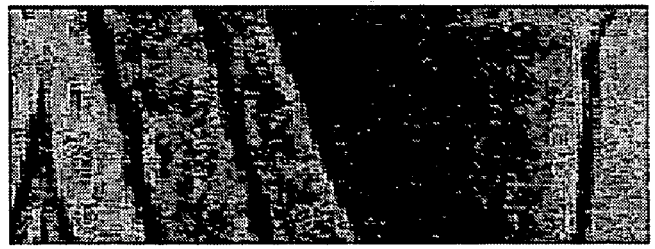
Figure 11:
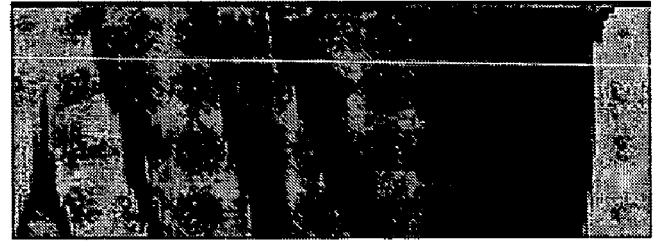

FIG. 11 shows Height, Q and frequency images of an Alkain ($C_{390}$) surface. A stack of single-molecule thick layers (approximately 9 nm per layer) of Alkain ($C_{390}$) was grown on a mica substrate. Topography (Height), inverse energy dissipation (Q), and elasticity (f) images of the surface are shown. Each image corresponds to the same 2.5 μm by 10 μm area of the Alkain surface. The darkness of shading in each image reflects the magnitude of the respective parameter plotted. The center-right portion of each image represents an area of bare mica. Moving toward the left side of each image, plateaus of Alkain one, two, three and four Alkain molecules thick are encountered. In the images of Q and f it can be seen that energy dissipation and elastic processes vary dramatically at the edges of each plateau.

The images were obtained using a data acquisition scheme in which an SPM system similar to that shown in FIG. 1 switches between topography mode (switch 140, position 1) and advanced modes (switch 140, position 2) in which frequency or damping parameters serve as the error signal for positioning a cantilever near a surface.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for measuring properties of a sample comprising:
   providing a cantilever comprising a tip;
   interacting the tip with a sample;
   imparting a series of temporary driving signals to the cantilever;
   recording a series of transient cantilever responses corresponding to the driving signals;
   coherently averaging the series of transient cantilever responses; and,
   extracting frequency and decay time information from averaged transient responses.

2. The method of claim 1 further comprising:
   calculating a viscoelastic property of the sample using at least one of the frequency and the decay time information.

3. The method of claim 2 wherein: recording and coherently averaging a series of transient cantilever responses, extracting frequency and decay time information, and calculating the viscoelastic modulus of the sample, are performed in less than 100 milliseconds.

4. The method of claim 3 wherein calculating the viscoelastic modulus of the sample yields measurements of sample properties with 100 nanometer or better spatial resolution.

5. The method of claim 1 wherein the coherent averaging is registered in time by synchronization signals from a master clock that also triggers the driving signals.

6. The method of claim 1 wherein the coherent averaging is performed by detecting a trigger level in the transient responses.

7. The method of claim 1 wherein the transient response is a free decay of the cantilever.

8. The method of claim 1 wherein the driving signal causes the cantilever to oscillate in a flexural mode.

9. The method of claim 1 wherein the driving signal comprises a pulse.

10. The method of claim 1 wherein the driving signal comprises a burst of pulses with a repetition rate near the frequency of a cantilever mode.

11. The method of claim 1 wherein the driving signal is repeated periodically.

12. A system for measuring properties of a sample comprising:
    a cantilever comprising a tip;
    an actuator that imparts temporary driving signals to the cantilever;
    a detector that detects cantilever transient responses to the driving signals;
    an averaging system that coherently averages the cantilever transient responses when the tip interacts with a sample; and,
    a processor that calculates a material property of the sample from an averaged transient response of the cantilever interacting with the sample,
    wherein the driving signals are at or near the resonance frequency of a cantilever mode.

13. The system of claim 12 wherein the material property is elastic modulus, viscoelastic modulus, adhesion or energy dissipation.

14. The system of claim 12 wherein the material property is calculated in less than 100 milliseconds.

15. The system of claim 12 wherein the actuator is a piezoelectric actuator.

16. The system of claim 12 wherein the actuator excites a fundamental flexural mode in the cantilever.

17. The system of claim 12 wherein the actuator excites a higher order flexural mode in the cantilever.

18. The system of claim 12 wherein the actuator is integrated with the cantilever.

19. The system of claim 12 wherein the driving signals comprise a pulse.

20. The system of claim 12 wherein the driving signals comprise a burst of pulses.

21. A system for measuring properties of a sample comprising:
- a scanning probe microscope comprising an active cantilever with a tip;
- a master clock signal that triggers transient cantilever excitations;
- an averaging system synchronized to the master clock signal;
- a processor;
- wherein,
    - the averaging system coherently averages transient cantilever responses to the excitations; and,
    - the processor calculates a material property of a sample from averaged transient cantilever responses recorded while the tip interacts with the sample;
- a system that repositions the cantilever with respect to the sample between measurements; and,
- a feedback control that maintains a constant interaction between the tip and the sample during repositioning of the cantilever, wherein the interaction maintained constant is cantilever oscillation amplitude.

22. A system for measuring properties of a sample comprising:
- a scanning probe microscope comprising an active cantilever with a tip;
- a master clock signal that triggers transient cantilever excitations;
- an averaging system synchronized to the master clock signal;
- a processor;
- wherein,
    - the averaging system coherently averages transient cantilever responses to the excitations; and,
    - the processor calculates a material property of a sample from averaged transient cantilever responses recorded while the tip interacts with the sample;
- a system that repositions the cantilever with respect to the sample between measurements; and,
- a feedback control that maintains a constant interaction between the tip and the sample during repositioning of the cantilever, wherein the interaction maintained constant is the real or imaginary component of cantilever free-decay frequency.

* * * * *